UNITED STATES PATENT OFFICE.

JOHN T. PEET, OF CINCINNATI, OHIO.

IMPROVED COMPOSITION FOR FRAMES, BOTTLES, &c.

Specification forming part of Letters Patent No. 49,147, dated August 1, 1865.

*To all whom it may concern:*

Be it known that I, JOHN T. PEET, of Cincinnati, Hamilton county, Ohio, have invented a new and useful Composition for the Manufacture of Picture-Frames, Medallions, and other Articles; and I do hereby declare the following to be a full, clear, and exact description thereof.

I take mineral-pitch, whether in the form of asphaltum or in that of residuum from the distillation of petroleum, and, having reduced to a liquid form by heat, I stir in brick-dust or any other suitable substance, in a state of granulation or powder, until of the desired consistence for the purpose intended.

In the manufacture of statuary I blend one hundred and twenty-five pounds of dust with one hundred pounds of the pitch. In the manufacture of picture-frames I blend equal weights of pitch and dust, while in the manufacture of a variety of small and delicate articles—such as light ornaments, rosettes, &c.—I mix with one hundred pounds of pitch but seventy-five pounds of dust.

Although preferring brick-dust, I have used with success, and desire to claim in this connection, the following articles in a comminuted form: marble, limestone, charcoal, sand, earthenware, whiting, plaster-of-paris, and sawdust.

This composition may be used in the manufacture of a great variety of articles—such as bottles, letters for signs, architectural and cabinet decorations, and, in short, wherever plaster-of-paris has been employed—and to a better purpose, because of resisting the action of heat, cold, and moisture.

For some purposes—such as match-plates and follow-boards in foundry work—I employ rosin in preference to pitch.

I am aware that Charles Truesdale and Abner J. Sennett, of Cincinnati, claim to be the first to have manufactured match-plates and follow-boards of a composition of brick and sawdust with pitch, and therefore, without denying or affirming said alleged right, I desire to waive all claim thereto under this specification or any patent that may issue thereon.

I claim—

The use of asphaltum or rosin with any suitable powder to the end and for the purposes substantially as set forth.

In testimony of which invention I hereunto set my hand.

JOHN T. PEET.

Witnesses:
GEO. H. KNIGHT,
JAMES H. LAYMAN.